(12) United States Patent
Dick et al.

(10) Patent No.: US 11,935,295 B2
(45) Date of Patent: Mar. 19, 2024

(54) SCENE CACHING FOR VIDEO CAPTURE DATA REDUCTION

(71) Applicant: The Regents of the University of Michigan, Ann Arbor, MI (US)

(72) Inventors: Robert P. Dick, Chelsea, MI (US); Benjamin Scott Simpson, Ann Arbor, MI (US); Ekdeep Singh Lubana, Ann Arbor, MI (US); Pengyuan Huang, Harbin (CN)

(73) Assignee: The Regents of the University of Michigan, Ann Arbor, MI (US)

( * ) Notice: Subject to any disclaimer, the term of this patent is extended or adjusted under 35 U.S.C. 154(b) by 4 days.

(21) Appl. No.: 17/335,993

(22) Filed: Jun. 1, 2021

(65) Prior Publication Data

US 2021/0374411 A1 Dec. 2, 2021

Related U.S. Application Data

(60) Provisional application No. 63/032,968, filed on Jun. 1, 2020.

(51) Int. Cl.
*G06V 20/40* (2022.01)
*H04N 5/14* (2006.01)
*H04N 7/01* (2006.01)

(52) U.S. Cl.
CPC .............. *G06V 20/40* (2022.01); *H04N 5/145* (2013.01); *H04N 7/0117* (2013.01)

(58) Field of Classification Search
CPC ....... G06V 20/40; H04N 5/145; H04N 7/0117
See application file for complete search history.

(56) References Cited

U.S. PATENT DOCUMENTS

| | | | |
|---|---|---|---|
| 2012/0314093 A1* | 12/2012 | Tamayama | G06T 5/50 348/208.1 |
| 2017/0221217 A1* | 8/2017 | Hong | G06T 7/74 |
| 2020/0007853 A1* | 1/2020 | Mlinar | H04N 9/07 |
| 2021/0089803 A1 | 3/2021 | Lubana et al. | |

OTHER PUBLICATIONS

E. S. Lubana and R. P. Dick; Digital Foveation: an energy-aware machine vision framework; IEEE Trans. on Computer-Aided Design, pp. 2371-2380, Nov. 2018.

(Continued)

*Primary Examiner* — Girumsew Wendmagegn
(74) *Attorney, Agent, or Firm* — LEMPIA SUMMERFIELD KATZ LLC

(57) ABSTRACT

A method for processing a video stream includes obtaining frame data of a current frame of the video stream, determining frame difference data based on a comparison of the frame data of the current frame and scene cache data for a previous frame of the video stream, the scene cache data being stored in a scene cache for the video stream, determining, based on the frame difference data, regions of the video stream to be re-sampled at a higher resolution than the frame data, obtaining re-sampling data for the determined regions, updating the scene cache data based on the obtained frame data and the re-sampling data, and providing the re-sampling data to a processor to update an analysis scene cache for the video stream.

20 Claims, 6 Drawing Sheets

(56) References Cited

OTHER PUBLICATIONS

A. Amir et al.; A low power, fully event-based gesture recognition system; In Proc. Conf. on Computer Vision and Pattern Recognition, pp. 7388-7397, Jul. 2017.

A. Narayanan, S. Verma, E. Ramadan, P. Babaie, and Z.-L. Zhang; DeepCache: A deep learning based framework for content caching; in Proc. Wkshp. on Network Meets AI & ML, 2018, pp. 48-53.

Benjamin Simpson and Yuchen Liu; DVS dataset; http://ziyang.eecs.umich.edu/tools.html#dvsdata, 2020; 3 pp.

Brown et al.; Automatic panoramic image stitching using invariant features; International Journal of Computer Vision, 2007; vol. 74(1); pp. 59-73.

Cartucho; mean Average Precision; 2018. [Online]. Available: https://github.com/Cartucho/mAP; 10 pp.

Digital Vision Security, Inc.; Digital vision security—video camera surveillance systems & solutions; https://www.youtube.com/channel/UCSeMkpNPR7UGFOIBfZ0bRNg, 2014-2020; 2 pp.

F. Perazzi et al.; A benchmark dataset and evaluation methodology for video object segmentation; in Proc. Conf. on Computer Vision and Pattern Recognition, 2016; pp. 724-732.

J. E. Niven and S. B. Laughlin, Energy limitation as a selective pressure on the evolution of sensory systems; J. of Experimental Biology, vol. 211, No. 11, pp. 1792-1804, 2008.

J. Pont-Tuset, F. Perazzi, S. Caelles, P. Arbel'aez, A. Sorkine-Hornung, and L. Van Gool; The 2017 Davis challenge on video object segmentation; arXiv:1704.00675, 2017, 6 pp.

Joseph Redmon and Ali Farhadi; YOLOv3: An incremental improvement; arXiv:1804.02767v1, 2018; 6 pp.

L. M. Feeney and M. Nilsson; Investigating the energy consumption of a wireless network interface in an ad hoc networking environment; in Proc. Joint Conf. of the IEEE Computer and Communications Society, vol. 3, Apr. 2001, pp. 1548-1557.

Mireille B'elanger, Igor Allaman, and Pierre J. Magistretti; Brain energy metabolism: Focus on astrocyte-neuron metabolic cooperation; Cell Metabolism, vol. 14 (6); 2011; pp. 724-738.

N. Goyette, P. Jodoin, F. Porikli, J. Konrad, and P. Ishwar; Changedetection.net: A new change detection benchmark dataset; in Proc. Conf. on Computer Vision and Pattern Recognition Workshops, Jun. 2012, 9 pp.

R. LiKamWa, B. Priyantha, M. Philipose, L. Zhong, and P. Bahl; Energy characterization and optimization of image sensing toward continuous mobile vision; in Proc. ACM Int. Conf. Mobile Syst. Appl. Services, Taipei, Taiwan, 2013, pp. 69-81.

Y. Zhu, A. Samajdar, M. Mattina, and P. N. Whatmough; Euphrates: Algorithm-SoC co-design for low-power mobile continuous vision; in Proc. Int. Symp. Computer Architecture, 2018, 14 pp.

\* cited by examiner

SCENE CACHING FOR VIDEO CAPTURE DATA REDUCTION

CROSS-REFERENCE TO RELATED APPLICATION

This application claims the benefit of U.S. provisional application entitled "Scene Caching for Video Capture Data Reduction," filed Jun. 1, 2020, and assigned Ser. No. 63/032,968, the entire disclosure of which is hereby expressly incorporated by reference.

BACKGROUND OF THE DISCLOSURE

Field of the Disclosure

The disclosure relates generally to video stream compression and machine vision.

Brief Description of Related Technology

Machine vision has transformed numerous practical domains, including security, healthcare, banking, and transportation. However, machine vision systems typically have high energy consumption. The high energy consumption wastes resources and limits deployment scenarios. For instance, battery powered applications may not be capable of implementing machine vision tasks. Thus, efficient image analysis would be useful to support battery-power and other energy-constrained machine vision applications.

SUMMARY OF THE DISCLOSURE

In accordance with one aspect of the disclosure, a method for processing a video stream includes obtaining, by a first processor, frame data of a current frame of the video stream, determining, by the first processor, frame difference data based on a comparison of the frame data of the current frame and scene cache data for a previous frame of the video stream, the scene cache data being stored in a scene cache for the video stream, determining, by the first processor, based on the frame difference data, regions of the video stream to be re-sampled at a higher resolution than the frame data, obtaining, by the first processor, re-sampling data for the determined regions, updating, by the first processor, the scene cache data based on the obtained frame data and the re-sampling data, and providing, by the first processor, the re-sampling data to a second processor to update an analysis scene cache for the video stream.

In accordance with another aspect of the disclosure, a machine vision method includes obtaining, by a first processor, frame data of a current frame of the video stream, determining, by the first processor, frame difference data based on a comparison of the frame data of the current frame and scene cache data for a previous frame of the video stream, the scene cache data being stored in a scene cache for the video stream, determining, by the first processor, based on the frame difference data, regions of the video stream to be re-sampled at a higher resolution than the frame data, obtaining, by the first processor, re-sampling data for the determined regions, updating, by the first processor, the scene cache data based on the obtained frame data and the re-sampling data, transmitting, by first processor, the re-sampling data to a second processor to update an analysis scene cache for the video stream, updating, by the second processor, the analysis scene cache in accordance with the transmitted re-sampling data, implementing, by an application processor, a machine vision task based on the updated analysis scene cache.

In accordance with yet another aspect of the disclosure, a system for processing a video stream includes an image sensor configured to capture frame data of a current frame of a video stream, and a first processor coupled to the image sensor, the first processor being configured to determine frame difference data based on a comparison of the frame data of the current frame and scene cache data for a previous frame of the video stream, the scene cache data being stored in a scene cache for the video stream, determine, based on the frame difference data, regions of the video stream to be re-sampled at a higher resolution than the frame data, obtain re-sampling data for the determined regions, update the scene cache data based on the obtained frame data and the re-sampling data, and provide the re-sampling data to a second processor to update an analysis scene cache for the video stream.

In connection with any one of the aforementioned aspects, the systems and/or methods described herein may alternatively or additionally include or involve any combination of one or more of the following aspects or features. Determining the frame difference data includes subtracting the scene cache data from the frame data of the current frame. Determining the frame difference data includes determining, by the first processor, shared motion data for the frame data, and aligning, by the first processor, the frame data and the scene cache data based on the shared motion data before implementing the comparison. Determining the shared motion data includes computing, by the first processor, a homography transform matrix for the frame data. Providing the re-sampling data includes providing the homography transform matrix to the second processor. Determining the shared motion data includes determining, by the first processor, motion vectors based on the frame data and the scene cache data. Determining the shared motion data includes determining, based on the motion vectors, regional shared motion data and global shared motion data. Determining the regional shared motion data and the global shared motion data includes tracking grid-based points by local and global optical flows, and separating the local and global optical flows using a clustering technique. Determining the regions to be re-sampled includes applying a difference threshold to the frame difference data. Determining the frame difference data includes determining a rate of change for each region of the video stream. Providing the re-sampling data includes transferring, to the second processor, boundary coordinates for the re-sampling data. The system further includes an application processor coupled to the second processor and configured to implement a machine vision task based on the analysis scene cache. The first processor is integrated with an image signal processor at a camera node. The system further includes a computer server remote from the image sensor, the computer server including the second processor. The first and second processors are configured as an encoder and a decoder, respectively. The first processor is further configured to determine the frame difference data by subtracting the scene cache data from the frame data of the current frame. The first processor is further configured to determine shared motion data for the frame data, and align the frame data and the scene cache data based on the shared motion data before implementing the comparison. The first processor is further configured to transfer, to the second processor, boundary coordinates for the re-sampling data.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
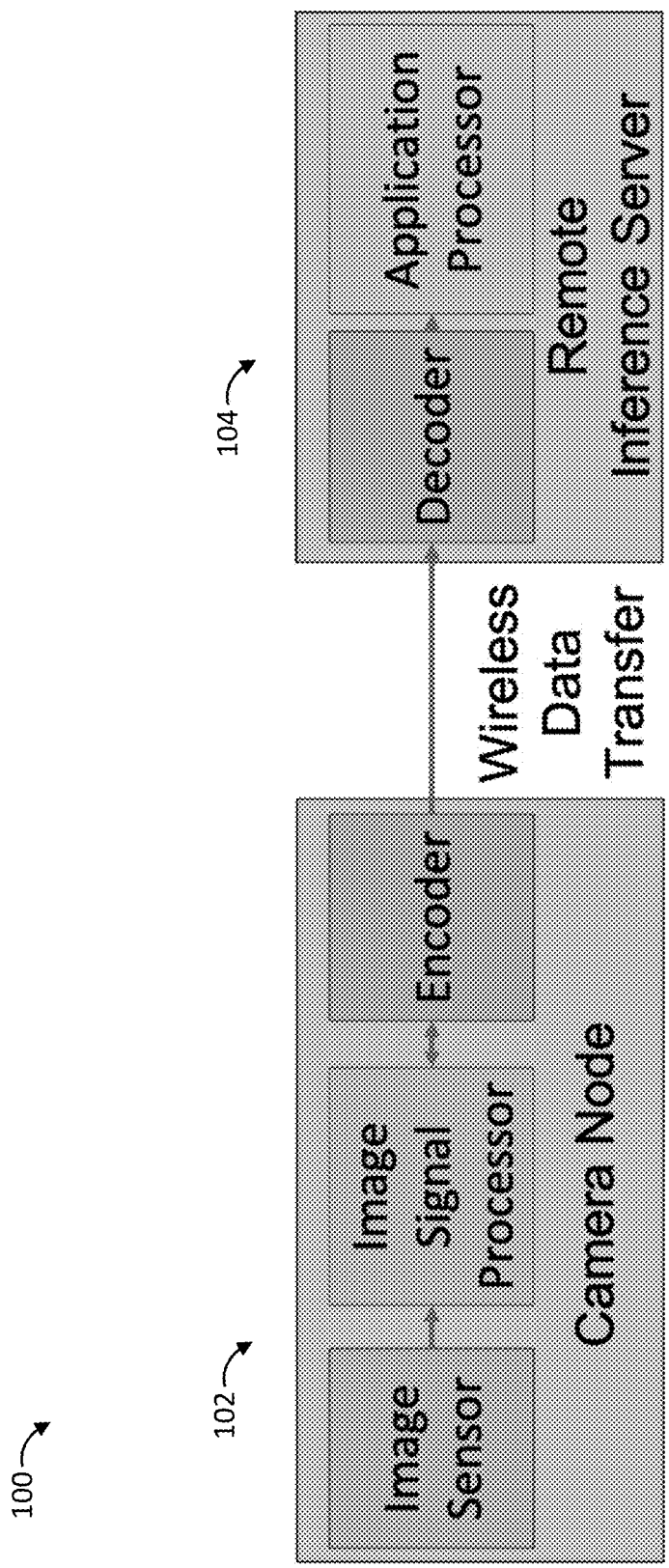
FIG. 1 is a block diagram of a system configured for processing a video stream with scene cache functionality in an image signal processing pipeline in accordance with one example.

The embodiments of the disclosed systems and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Systems and methods are described that provide improved machine vision performance operating on video streams. The disclosed systems and methods reduce the amount of data captured and transferred from image sensors to analysis servers in a data-aware manner. In one aspect, the disclosed systems and methods combine guided, highly heterogeneous sampling with an intelligent Scene Cache. This enables the system to adapt to spatial and temporal patterns in the scene, thus reducing redundant data capture and processing. An example of the disclosed systems and methods running on a general-purpose embedded processor enables superior object detection accuracy (e.g., by 56%) at similar energy consumption (e.g., an improvement of 4%) compared to an H.264 hardware accelerator. An example of a dynamic scene cache that works on video taken by a moving camera is also described.

The disclosed systems and methods may be useful in a wide variety of applications and fields, including, for instance, smart infrastructure, autonomous vehicles, healthcare, and surveillance. The disclosed systems and methods are useful in battery-powered and/or embedded systems, but not limited thereto.

Although the disclosed systems and methods are described in connection with analysis and other servers, any one or more aspects of the data processing may be implemented locally. The number, location, arrangement, configuration, and other characteristics of the processor(s) of the disclosed systems, or the processor(s) used to implement the disclosed methods, may vary accordingly.

Although described in connection with machine vision tasks and applications, the disclosed methods and systems are useful in connection with other applications involving video compression. The configuration, arrangement, location, and other characteristics of the components of the disclosed systems may vary accordingly. The disclosed methods and systems may vary in alternative or additional ways. For instance, the disclosed systems and methods may also incorporate one or more characteristics of human vision systems.

Standard cameras sample data in a spatially and temporally constant manner, e.g., with fixed frame resolutions and rates. However, the sampling and processing of the human vision system (HVS) are spatially and temporally heterogeneous. The photoreceptive structures of the human vision system react to changes in light intensity, producing output signal spikes when a threshold is exceeded. Since neuron energy consumption is correlated with signaling, this temporal method improves energy efficiency. In the human vision system, photoreceptors are arranged heterogeneously, with their density varying between the center and the periphery. This reduces energy consumption relative to uniform, high-resolution sampling, but involves guidance based on end goals and scene content.

The retinas of the human vision system react to changes in light intensity, producing output signal spikes when the change exceeds a threshold. This is in contrast to standard frame-based cameras where the measured light intensity at each pixel is read out each frame, regardless of whether the light intensity changed. Since neuron energy consumption is correlated with spiking, the HVS is able to save sensing energy by only reacting to change.

Additionally, typical image sensors use a uniform array of pixels, whereas the photoreceptors of the human vision system are arranged heterogeneously. The density is highest at the center of the field of view and rapidly decreases to low density in the periphery. This saves energy compared to having uniform high-density photoreceptors. Thus the human vision system has methods for saving energy both spatially and temporally as opposed to a standard frame-based camera.

In many applications, it is common to have little change between frames, leading to high amounts of temporal redundancy. While the human vision system has the ability to adapt to this, standard frame-based cameras do not.

Modern image sensors support operations for both subsampling and region-specific sampling, supporting heterogeneous spatial capture. The sensing technique of the disclosed systems and methods combines heterogeneous sampling with an intelligent cache of prior samples. Comparing low-resolution captures with the cache identifies changes, e.g., moving regions, allowing the system to modulate spatial capture. This technique allows machine vision systems to use guided sampling like the human vision system, a process referenced herein as scene caching.

The scene caching of the disclosed systems and methods is compatible with any standard machine vision technique, method, or system. Since the updates in the scene caching are change-based, the disclosed methods and systems will be most efficient if few pixels change, making the methods and systems well suited for use with stationary cameras. Thus, one example of scene caching involves for object detection or surveillance tasks. Performance is measured or otherwise addressed in both energy consumption and object detection accuracy. The accuracy is quantified using a variant of mean average precision (mAP), referenced herein as weighted mAP (WmAP). Energy consumption is compared with industry-standard H.264 compression.

Motion models can enable the scene cache to be efficiently used with systems having moving cameras, by compensating for changes that are predictable based on estimated or measured changes to camera position and orientation. These estimates may be made via analysis of background motion in the scene, or via camera-mounted inertial measurement units including, for instance, one or more of the following sensors: accelerometers, gyroscopes, and magnetometers.

As described herein, the disclosed systems and methods utilize or present (1) a scene cache that uses heterogeneous spatial capture, temporal buffering, and multi-round capture to allow machine vision systems to use guided sampling to improve accuracy without energy penalties; 2) a video object detection dataset; and 3) an energy model for embedded machine vision systems. In one example, the model is calibrated to a Raspberry Pi 3B+ processor (other processors may be used), and accounts for wireless transmission and H.264 video encoding energy, but can be easily adapted to another embedded system. The scene caching of the disclosed systems and methods fits seamlessly into existing pipelines and permits dynamic trade-offs between data rate and image quality. In comparison to hardware-based H.264 compression, the scene caching of the disclosed systems and methods improves object detection (e.g., by 55.7%, as measured by WmAP), while reducing energy consumption (e.g., by 3.6%).

While only working on stationary videos is adequate for many applications, a scene cache that can be used with video from a moving camera opens up a realm of applications, including, for instance, autonomous vehicles and augmented reality (AR). The incorporation of motion correction into the disclosed systems and methods is accordingly also addressed and analyzed in connection with applying the scene cache of the disclosed systems and methods to moving videos.

Described herein is a scene caching functionality that fits seamlessly into existing machine vision pipelines. The scene caching functionality captures and transmits scene data at region-dependent, dynamically changing minimum rates adequate to prevent the scene cache from diverging from reality. Applications include general-purpose video compression. However, the performance and energy implications of using the approach in machine vision systems in which video data are transmitted through wireless communication links are evaluated herein. It permits easy, dynamic trade-offs between data rate and image quality.

The disclosed systems and methods may be integrated with, or otherwise include, one or more elements or acts described in Lubana, et al., "Digital Foveation: an energy-aware machine vision framework." IEEE Trans. on Computer-Aided Design, pp. 2371-2380 (2018), and U.S. Patent Application Ser. No. 62/905,918 ("Digital Foveation for Machine Vision"), the entire disclosures of which are hereby incorporated by reference. The digital foveation systems and methods described therein implement heterogeneous sampling mechanisms for single frame captures. Those systems and methods may use row/column decoders in image sensors to capture arbitrary rectangular regions of chosen resolution in a static scene. Those systems and methods may use a multi-round heterogeneous capture-analysis process in single frame scenarios. The disclosed systems and methods are not limited to analyzing single-frame captures. Modeling a system capturing videos significantly differs from single frame captures because the idle time of the system and transfer time of the video dominate time and energy consumption. This change in energy-accuracy trade-off and the opportunities opened by temporal sequences differentiate the single frame and video variations of this problem.

The disclosed systems and methods can be contrasted from event cameras, which are specialized image sensors that sample a spatial signal in response to change in intensity. The event camera method was inspired by the human visual system and naturally avoids temporally redundant sampling. Event cameras are rarely used and the tools and algorithms for processing their output stream are not directly compatible with regular video. Converting their output stream to work with standard machine vision algorithms reduces the energy savings offered by event-based sensing.

The disclosed systems and methods can also be contrasted from reduced application algorithm computation approaches to object detection. In such approaches, custom hardware is used to estimate the motion of regions of interest, thus reducing the number of frames involving expensive object detection. In contrast, the disclosed systems and methods may not involve hardware augmentation because the operations implemented by the disclosed systems and methods are already supported by the camera pipeline.

Other systems have used motion correction to take advantage of the redundancies of video data by correlating data between frames. For example, motion vectors derived from macroblock matching have been used to correlate regions between frames. These and additional motion models have been used to interpolate region of interest (ROI) motion, allowing it to avoid running expensive object detection algorithms every frame. Intermediate computations of convolutional neural network (CNN) layers have been stored, and matched macroblocks have been used, to avoid recomputing CNN values. These approaches may present energy savings, but are not comparable to the savings realized by the Scene Cache of the disclosed systems and methods because they take into account object detection inference energy, while Scene Cache focuses on data sensing and transmission energy.

The motion-corrected (or dynamic) Scene Cache of the disclosed systems and methods may rely on homography transforms to correct for camera motion between frames. This approach may be based on a method for panoramic image stitching. However, the Scene Cache of the disclosed systems and methods uses the approach to correct for motion between video frames. Further details regarding the approach are set forth below.

The disclosed systems and methods focus on input level caching. The disclosed systems and methods may involve a small amount of memory (e.g., 20 KB) on the client embedded system. This is in contrast to caching techniques directed to reducing neural network computation by caching activations of the current frame and reusing those activations by matching the blocks from a new frame with those of the previous frame. Such techniques use convolutional layers are usually large in number and bitwidth, thereby increasing memory requirements, making it impractical for embedded deployment. Further, the feedback pipeline in such techniques can incur too much latency to be practical in IoT applications.

The disclosed systems and methods may exploit temporal correlation within a signal for efficient video encoding. However, by focusing on inference, rather than video aesthetics and reconstruction, the disclosed systems and methods are capable of achieving higher application performance, while consuming similar amounts of energy. For instance, one example Scene Cache implementation improved object detection by 55.7% and reduced energy consumption by 3.6% relative to a hardware-based H.264 compression baseline.

FIG. 1 shows an image processing pipeline or system 100 for processing a video stream in accordance with one example. In some cases, the system 100 is configured for server-based object detection from wireless cameras. At a camera node 102 of the system 100, the pipeline or system 100 includes an image sensor configured to capture frame data of a current frame of a video stream, an image signal processor coupled to the image sensor, and an encoder or other processor coupled to the image signal processor. As described herein, the encoder or other processor at the camera node 102 implements or provides a scene cache to support more efficient transfer of the frame data. At a server node 104 of the system 100, the pipeline or system 100 includes a decoder or other processor and an application processor coupled to the decoder. The server node 104 may be configured as, or otherwise include, a remote inference server. The scene cache is regenerated, replicated, or otherwise used or supported by the decoder or other processor as an analysis scene cache at the server node 104. In some cases, the application processor may be configured to implement a machine vision task or other inference analysis based on the analysis scene cache.

The nodes 102, 104 of the system 100 may be remote from one another. For instance, communications between the nodes 102, 104 may be or include wireless communications. In contrast, the processor and other components at each node may be integrated with one another to any desired extent.

The image sensor is configured to capture frame data of a current frame of a video stream. The encoder or other processor coupled to the image sensor is configured to implement a number of acts or procedures in connection with a scene cache-based approach to video compression. As described herein, the processor is configured to determine frame difference data based on a comparison of the frame data of the current frame and scene cache data for a previous frame of the video stream. The scene cache data is stored in a scene cache for the video stream. The scene cache may be, correspond with, utilize, or otherwise include or involve a memory, storage device or memory element of the decoder or other processor or element at the camera node.

As described herein, the encoder or other processor is further configured to determine, based on the frame difference data, regions of the video stream to be re-sampled at a higher resolution than the frame data, generate re-sampling data for the determined regions, update the scene cache based on the obtained frame data and the re-sampling data, and provide the re-sampling data to the decoder or other processor to update an analysis scene cache for the video stream. Further details regarding the acts implemented by the processors are provided below in connection with a number of examples.

In this example, the pipeline 100 includes a camera that wirelessly transmits video data to a server computer or node 104, which performs object detection or other inference analysis. The camera node captures raw data and converts the raw data to a standard video format using an image signal processor. An on-device encoder compresses the video, which is then transmitted to the server. The server decoder un-compresses the video before object detection or other procedures are executed on the application processor.

In the example of FIG. 1, the encoder and decoder together provide or support scene cache functionality. The scene cache functions as an encoder-decoder pair. On the camera, the encoder (or other processor) detects change at each frame and determines the regions to transmit to the remote inference server. On the server, the decoder (or other processor) reconstructs the transmitted data into a high resolution image.

The system 100 may include additional, alternative, or fewer elements. For instance, the system 100 may include hardware accelerators for use in various computational tasks. The hardware accelerators may be configured to obtain motion vector data from an existing H.264 encoder.

In some cases, the video signal is then transmitted wirelessly to a remote inference server, where the application processor performs a machine vision task, such as object detection. However, the Scene Cache-based compression technique of the disclosed systems and methods may also be applied in other applications, including, for instance, other applications currently being served by the H.264 standard.

The scene cache functionality of the disclosed methods and systems sits between image signal processing and application processing. On the camera, the processor for the cache detects change at each frame and determines the regions to transmit to the remote inference server. On the server, the processor for the cache reconstructs the transmitted data into a high resolution image for the machine vision task and/or other analysis.

In one aspect, the scene cache functionality of the disclosed methods and systems reduces video stream energy consumption and maximizes accuracy. This allows scene caching to either achieve higher accuracy for the same energy cost as alternative approaches, or lower energy cost for the same accuracy.

In another aspect, the scene cache functionality of the disclosed methods and systems may provide generality. An ideal scene cache only collects and transfers relevant data to the application server. This would involve knowledge of which data are important to the particular machine vision application. It would involve customization to each vision algorithm. Although that approach may be used in some cases, in other cases, the scene cache may be used with unmodified back-end machine vision algorithms.

The scene cache functionality of the disclosed methods and systems may work as a general-purpose video compressor, making data transmission decisions based on reconstruction error. In other cases, the scene cache functionality of the disclosed methods and systems may base sampling not only off of temporal change between frames but also spatial relevance of the sampling region. The outcome of CNN decisions is more affected by some pixels rather than others. The scene cache may take this into account to decide different sampling rates for change in different parts of an image. An example could be a traffic monitoring application that learns the accuracy of its decisions are less affected by regions corresponding to sky than to regions corresponding to road. It would adjust its sampling accordingly to be more responsive to sampling change on the road than in the sky.

The scene Cache may detect and transmit change using multiple (e.g., two) cached images: a low-resolution image at the camera node for computing which regions to sample and transfer, and a high-resolution cache at the server, which is provided as input to the analysis procedure.

Figure 2:
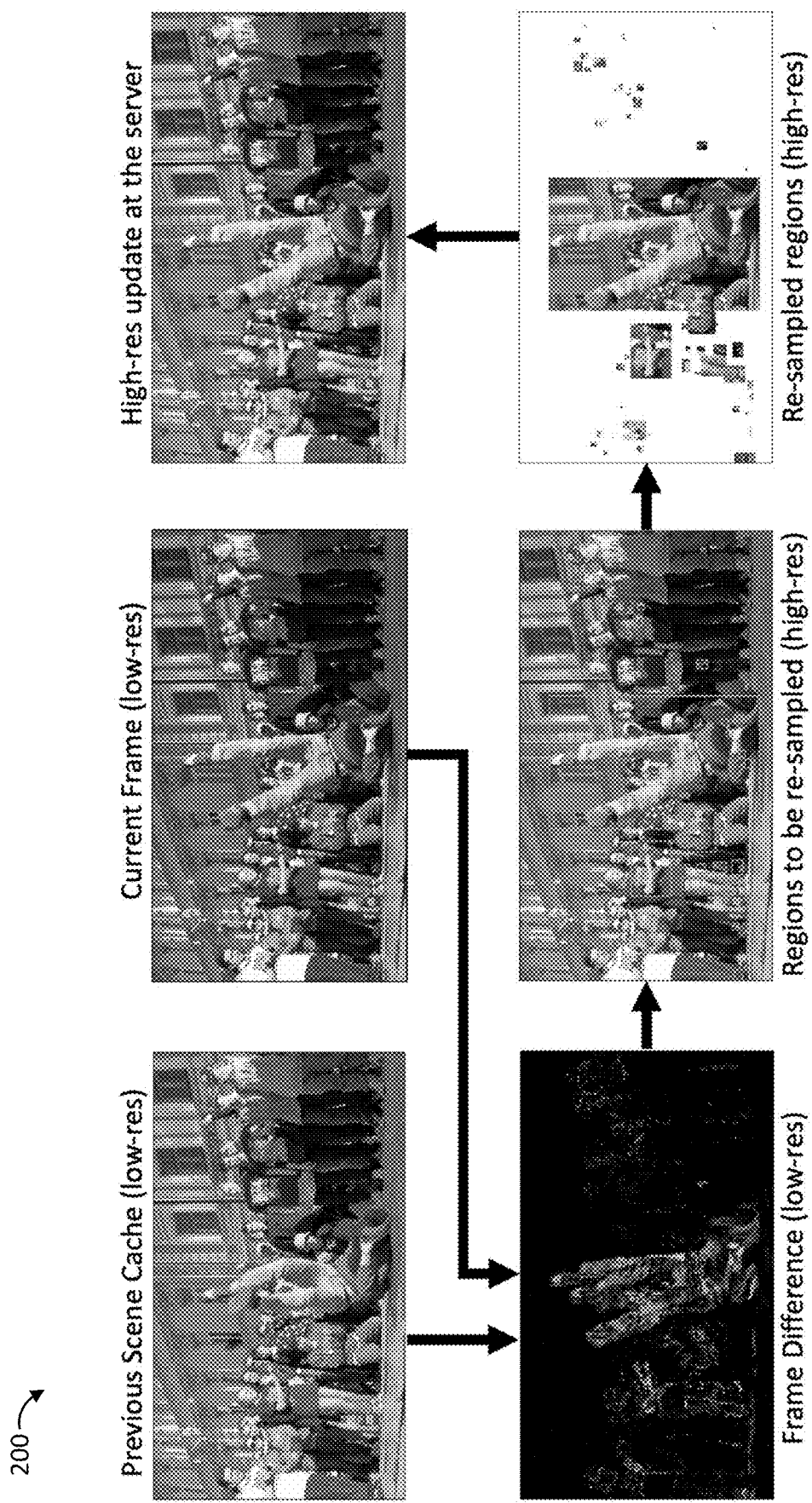
FIG. 2 is a flow diagram of a method of processing a video stream using scene cache functionality in accordance with one example.

FIG. 2 depicts a method of video compression using the scene cache functionality in accordance with one example. In this case, the update process for the scene cache functionality includes a number (e.g., four) of steps, each of which is described in detail below and visualized in the flow diagram and images of FIG. 2. Two parameters may be used to tune the cache's sampling behavior: the downsample rate and the difference threshold. The parameters themselves are described below in connection with the update process. Further details regarding the tuning process are also set forth below. Additional or alternative parameters may be used in other cases.

Cache Update Process

Low-resolution sampling. The Scene Cache uses a low-resolution image to estimate the amount of motion between frames. A low-resolution image may be acquired from the image sensor by skipping rows/columns or pixel binning, which is commonly available. The amount of decimation is controlled by the downsample rate. A downsample rate of 2 means that each pixel of the low-resolution image represents one 2×2 square in the high-resolution image, a downsample rate of 4 means each low-resolution pixel corresponds to a 4×4 high-resolution region, etc.

Motion estimation. The difference image is the element-wise difference between the low-resolution cache from the previous frame and the low-resolution version of the current frame, taking the $L^2$ norm across the three color channels, and normalizing each pixel's value to be between 0 and 255. The resulting one-channel, 8-bit image has low values in the pixels where little change has occurred and high values where large change has occurred.

Difference Thresholding. The Scene Cache selects regions to be updated. All pixels of the difference image with a value above a specified difference threshold are resampled. The cache obtains the bounding box coordinates for the regions using, for instance, OpenCV's findContours( ) and boundingRect( ) functions.

Static regions need not be updated. Therefore, only regions undergoing motion greater than a specified difference threshold are re-sampled. This ensures unimportant or stationary regions are not wastefully processed. Further, adjusting the threshold enables very simple static or dynamic control over the trade-off between energy (data transfer) reduction and accuracy.

High-Resolution update. The regions to be updated are sampled at high resolution from the image sensor using the bounding box coordinates of the previous step. These high-resolution regions are then transmitted to the remote server to update the cache, and the low resolution version of the frame is updated at the camera node.

Further details regarding camera motion correction are now provided.

The scene cache functionality of the disclosed methods and systems is useful when most of the background does not contain motion. The scene cache functionality may be modified to address such motion by adding one or more motion correction steps before the difference image is taken. This motion corrected scene cache may accordingly be referred to herein as "dynamic Scene Cache" while the previously described Scene Cache with no motion correction may be referred to herein as "static Scene Cache" or sometimes just "Scene Cache." The previous low-resolution cache is transformed to remove the effect of camera motion between it and the new low-resolution frame. This may be done using a homography transformation, e.g., using the method of Brown et al., "Automatic panoramic image stitching using invariant features," International Journal of Computer Vision, 74(1):59-73 (2007), the entire disclosure of which is hereby incorporated by reference. First, keypoints in both images are selected and preliminary matches are found using SIFT features. Second, the number of matches is pared by keeping only those points where the most likely match is better than the second most likely match by a specified margin, thus removing points with multiple ambiguous matches. Finally, the pruned set of points is fed to OpenCV's findHomography( ) function, which uses least-squares and other estimation techniques to find the appropriate homography matrix.

The low-resolution cache may be transformed using the homography matrix before the difference image is calculated. The homography matrix is sent to the server so that the high resolution image may be corrected before updates are applied.

Regions with motion exceeding the difference threshold are transferred to the server. By specifying the bounding coordinates, a high-resolution update for a specific region within the image is received. These high-resolution patches are then transmitted to the remote server for updating the previous frame, while the low resolution output of the frame is also updated at the camera node. Since only regions of interest accounting for a fraction of total scene data are transmitted to the server, energy consumption is reduced relative to the full-frame case, with little loss in accuracy.

The Scene Cache relies on motion detection to determine which pixels to sample in each frame. Unchanged pixels are already stored in the cache and need not be updated, thus allowing for a reduction in the amount of data transferred and processed.

The Scene Cache stores two images: a low-resolution image at the camera node for computing which regions to sample and transfer, and a high-resolution cache at the server, which is provided as input to the analysis algorithm. On the first frame, the Scene Cache has no previous data in its low- and high-resolution caches, so it samples the full-resolution frame from the image signal processor, resulting in a one-time initialization cost that is amortized over a very large number of subsequent capture events. After initialization, the update process proceeds as shown in FIG. 2.

The Scene Cache enables one to trade off data quantity against accuracy by statically or dynamically changing the two parameters: downsample rate and difference threshold. Increasing the downsampling rate reduces processing time for the camera to determine Scene Cache update regions, at the cost of reducing sensitivity to spatial information. Increasing the difference threshold reduces data transferred to the application server, but reduces temporal sensitivity to object motion. Therefore, a parameter sweep may be implemented to determine the Scene Cache configuration for an ideal or desired tradeoff between application performance and time/energy efficiency. A system may be put in place to adjust the downsampling and threshold rate, or any other relevant cache parameters, while the Scene Cache is running.

Energy Consumption

Embedded systems often face severe energy constraints. Industrial compression standards are supported in such constrained devices by designing specialized hardware encoders. The methodology of the disclosed systems and methods uses software to exploit existing hardware primitives in image sensors and therefore may not involve specialized hardware encoders.

The energy consumption of the disclosed systems and methods in connection with an example involving an embedded machine vision platform is now addressed. Specifically, an energy model for a Raspberry Pi 3B+ processor augmented with a Sony IMX219 image sensor is presented. The model presumes a pragmatic scenario where nodes collect and transmit video data wirelessly to a server for object detection as shown in FIG. 1. Note that such a setup is standard for surveillance applications, which has been estimated to generate more than 859 petabytes per day. The model is designed for a continuous video stream and takes into account inter-frame energy consumption as well as time and energy consumption for data transmission from the platform to a server. As shown below, the particulars of video energy consumption are significantly different from single frame captures. Note that the model can be adapted to other embedded platforms by measuring or calculating the appropriate parameters (see Table 2).

Figure 3:
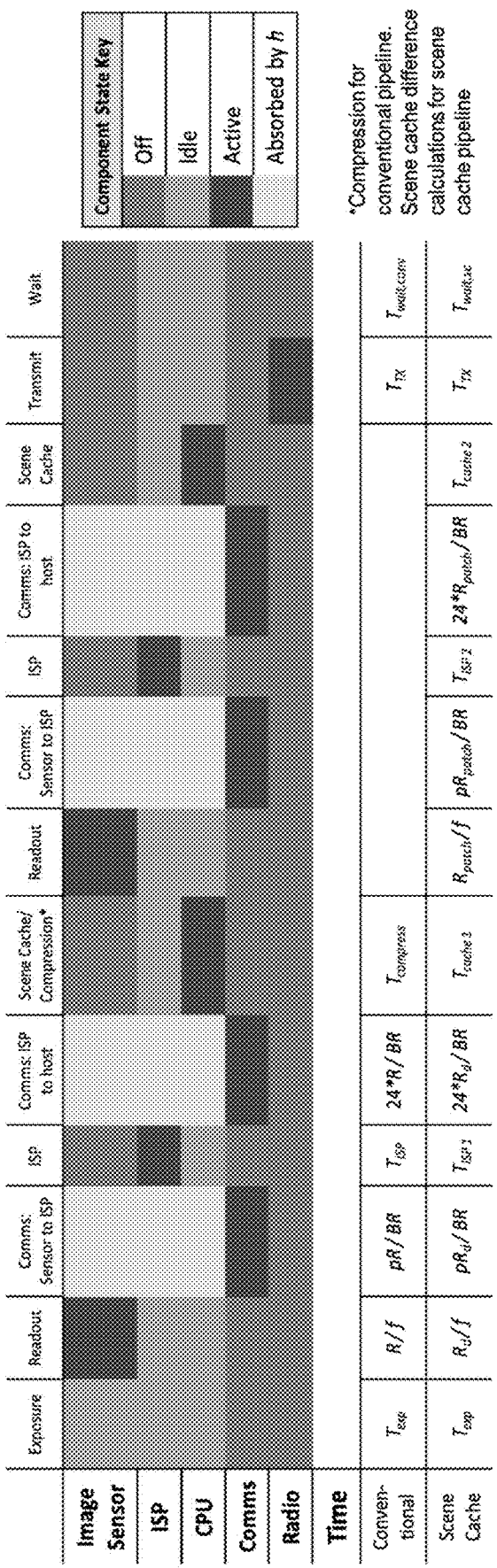
FIG. 3 is a diagram comparing pipeline stages of a conventional framework and a scene caching framework in accordance with one example.

The model uses a state-based methodology to estimate the energy consumed by components in the pipeline. A baseline for comparison is the capture and transfer of a video encoded by the on-board H.264 accelerator. Results for uncompressed video transfer are also presented. All videos are captured at 15 fps. FIG. 3 shows the pipeline stages for both a conventional camera network and one using Scene Caching.

The system's idle power consumption $P_{sys,idle}$ is measured with the device on, but not running any processes. All remaining power consumption is modeled with respect to this base idle power because the change in power is measured as a component goes from one state (e.g., idle) to another (e.g., active). This allows for modeling of system energy as a function of state changes and durations. In net, if the system has a set of components C and takes time $T_{frame}$ to completely process a single frame, the system energy can be written as follows:

$$E_{net} = P_{sys,idle} \cdot T_{frame} + \sum_{i \in C} P_{\Delta i, active} \cdot T_{i, active}, \quad (1)$$

where $P_{\Delta i, active}$ is the increase in system power consumption when the ith component becomes active, while $T_{i,active}$ is the time it remains active for.

Image Sensor (a,b,c)—Image sensor power consumption increases quadratically with respect to frame resolution, and is independent of sensor exposure time (Texp). Since the time consumed by reading a frame is the inverse of the frame rate (f), this results in the following energy model:

$$E_{sensor} = a \frac{R^2}{f} + b \frac{R}{f} + cT_{exp}. \quad (2)$$

In the above expression, a, b, c are model coefficients specific to the embedded system used, and R is the captured frame's resolution. Coefficients may be determined from Sony IMX219's datasheet for a quadratic power model by relating the sensor's power consumption at different capture resolutions to the corresponding image sizes. The exposure time is set to a constant value.

The conventional pipeline captures frames at a fixed resolution (R). Scene Cache, being a multi-round framework, involves a frame at a downsampled resolution ($R_d$) to determine the region of interest and a frame of variable resolution ($R_{patch}$) corresponding to the patch that contains the region of interest.

Image Signal Processor (TISP, $P_{\Delta GPU}$)—The Raspberry Pi's open source PiCamera framework may be used to determine the amount of time spent by the image signal processor (ISP) to process the captured frame. This duration is linearly related to the frame resolution. The increase in power when the ISP activates is determined by running an OpenGL program directly on the ISP. Note that the ISP, on a Raspberry Pi, is an embedded GPU. Its power consumption is accordingly called $P_{\Delta GPU}$. Therefore, the change in system energy if the ISP takes time $T_{ISP}$ to process a frame is as follows:

$$E_{ISP} = P_{\Delta GPU} \cdot (T_{ISP}). \quad (3)$$

Scene Cache ($T_{cache}$, $P_{\Delta CPU}$)—The Scene Cache runs on the CPU. The increase in CPU power consumption ($P_{\Delta CPU}$) is determined by measuring the increase in system power consumption when running a large random number generator. This power consumption is multiplied by the amount of time involved in the Scene Cache operations ($T_{cache}$) to determine the regions of change ($T_{cache1}$) and update the cache ($T_{cache2}$). These time values are measured for each frame by running the framework on a Raspberry Pi processor, but can be modeled on the specific embedded platform or processor of choice. The change in system energy if the CPU takes time $T_{cache}=T_{cache1}+T_{cache2}$ to run Scene Cache specific operations is as follows:

$$E_{cache} = P_{\Delta CPU} \cdot (T_{cache}). \quad (4)$$

Compression Energy ($e_1$, $e_2$)—The energy consumption for compressing frames using H.264 is determined by evaluating the energy consumption of the on-chip encoder module in the Raspberry Pi ISP at a constant frame rate and variable resolution. The energy consumed per frame is related to resolution with a linear model. The estimated model has a Pearson's correlation of 0.99 with the actual energy, indicating high confidence. This linear model is used to calculate energy consumption in our experiments:

$$E_{compress} = (e_1 \cdot R_{compress} + e_2). \quad (5)$$

Transmission Energy ($P_{ATX}$, $T_{TX}$)—To model the transmission energy, an 802.11n Wi-Fi network is set up and UDP packets are transmitted from one Raspberry Pi to another. The transmission power consumption ($P_{ATX}$) is linearly related to the number of packets transmitted per second. This is consistent with previous observations on modeling power consumption for embedded Wi-Fi transmitters. The transmission time per packet ($T_{TX}$) is kept constant by fixing the packet size. This results in the following energy model:

$$E_{TK} = P_{\Delta TX} \cdot (T_{TK}). \quad (6)$$

Communication Energy ($P_{Acomm}$, BR)—Communicating an image involves transfer of, e.g., 24 bits per pixel (8 bits each for 3 channels), which were extracted from a RAW image that had p bits per pixel, where p may be, for instance, 12 or 14. The communication time for system commands (e.g., wake, sleep, etc.) may impose a 20-50% overhead on data transfer. A variable h is used to denote this overhead. Given the bit rate (BR) of the system, the energy for communicating a frame of resolution R across the system is as follows:

$$E_{comm} = P_{\Delta comm} \cdot (1+h) \left( \frac{p \cdot R}{BR} + \frac{24R}{BR} \right). \quad (7)$$

Net Energy Model—Table 1 below summarizes the net energy models for both a conventional vision framework and the Scene Cache framework using the variables described herein. Note that the conventional model was modified to the Scene Cache pipeline as shown in in FIG. 3. Table 2 below describes example values of the parameters modeled in our framework. Table 3 below summarizes these parameters.

TABLE 1

Energy consumed by conventional and Scene Cache frameworks.
For symbol definitions, see Table 2 and Table 3.

| Framework | Energy model |
|---|---|
| Conventional | $a\dfrac{R^2}{f} + b\dfrac{R}{f} + cT_{exp} + P_{sys,idle} \cdot (T_{frame}) + P_{\Delta GPU} \cdot (T_{ISP}) +$ $(e_1 \cdot R_{compress} + e_2) + P_{\Delta TX} \cdot (T_{TX}) + P_{\Delta comm} \cdot (1 + h)\left(\dfrac{pR}{BR} + \dfrac{24R}{BR}\right)$ |
| Scene Cache | $a\left(\dfrac{R_d^2}{f} + \dfrac{R \cdot R_{patch}}{f}\right) + b\left(\dfrac{R_d}{f} + \dfrac{R_{patch}}{f}\right) + cT_{exp} + P_{sys,idle} \cdot (T_{frame}) + P_{\Delta CPU} \cdot (T_{ISP}) +$ $P_{\Delta CPU} \cdot (T_{cache}) + P_{\Delta TX} \cdot (T_{TX}) + P_{\Delta comm} \cdot (1 + h)\left(\dfrac{p(R_d + R_{patch})}{BR} + \dfrac{24(R_d + R_{patch})}{BR}\right)$ |

TABLE 2

Energy Model Par titer (p implies pixel)

| Param | Value | Units | Description |
|---|---|---|---|
| a | 8.27E–09 | W/p | Resolution-dependent image sensor active energy coefficient |
| b | 1.30E–01 | W | Resolution-independent image sensor active energy coefficient |
| c | 1.42E–01 | W | Image sensor idle power |
| f | 1.20E+07 | Hz | Image sensor clock frequency |
| $T_{exp}$ | 1.66E–02 | s | Camera exposure time |
| $P_{sys,\,idle}$ | 2.429 | W | System processor baseline power |
| $P_{\Delta GPU}$ | 0.335 | W | Increase in power with active GPU |
| $P_{\Delta CPU}$ | 0.211 | W | Increase in power with active CPU |
| $e_1$ | 1.20E–08 | J/p | Data-dependent H.264 energy |
| $e_2$ | 1.62E–02 | J | Data-independent H.264 energy |
| h | 0.25 | unitless | Inter-chip transmission overhead |
| p | 14 | bits/p | Bits per RAW pixel |
| BR | 4.00E+09 | bits/s | MIPI bit rate |
| $P_{\Delta comm}$ | 4.07E–02 | W | MIPI power consumption |

TABLE 3

Energy Model Variables

| Data | Units | Description |
|---|---|---|
| R | pixels | Full resolution image size |
| $R_d$ | pixels | Downsampled image size |
| $R_{fovea}$ | pixels | Foveated image size |
| $R_{compress}$ | pixels | Compressed image size |
| $T_{ISP}$ | s | Time for ISP to process pixel data |
| $T_{compress}$ | s | Image compression time |
| $T_{cache1}$ | s | Difference image calculation and bounding box generation time |
| $T_{cache2}$ | s | Downsampled cache update time |
| $T_{TX}$ | s | Transmission time |
| $P_{\Delta TX}$ | W | Radio power consumption |
| $T_{wait}$ | s | System idle time between frames |
| $T_{frame}$ | s | Time for one video frame (1/framerate) |

The results of a simulation of one example of the disclosed systems and methods are now presented. The client portion of the Scene Cache running on a Raspberry Pi 3 microcontroller was simulated to evaluate its impact on data transferred, energy consumption, and accuracy. The simulator logs data transfer and processing time, which are used to evaluate energy consumption of a typical vision system running the conventional (H.264) versus the cached pipeline on batches of videos. The evaluation methodology is first described, followed by a report of the results.

Application Performance—An object detection scenario is considered. Accuracy is measured using mean average precision (mAP) relative to a maximal data rate and resolution (e.g., uncompressed) base case. mAP assigns equal weights to each class detected, regardless of number of objects per class detected. Equal weight is useful for balanced datasets (e.g., an image dataset with similar number of objects per class), but may not be useful for real-world video datasets, because some objects appear much more frequently than others (e.g., cars are common in videos of intersections). Many of the infrequent objects are the result of classification noise in an automated labeling process for ground truth. Thus, equal weighting creates artificially low scores that are heavily affected by noise. Therefore, a weighted average across detected classes with weights based on the ground truth number of objects in each class is used. This metric is referred to herein as Weighted mAP (WmAP).

H.264 compression is used as an evaluation baseline. It suffers from high accuracy degradation when its energy consumption is similar to that of the Scene Cache. The Scene Cache may be implemented as a software-based solution. The H.264 baseline uses a hardware video encoder on our test platform. Use of custom Scene Cache hardware may thus further improve results.

Energy Consumption—As described in herein, energy consumption may be modeled as a function of per-frame data transfer, computation time, and hardware-specific parameters. The energy model is used to evaluate the energy implications of using Scene Cache in a practical setup. The energy model is compared with the H.264 compression baseline.

Datasets—Clips are selected from the CDW-2012 dataset with no camera motion for tuning the cache. The evaluated frames range in size from 320×240 to 720×576 pixels and videos range in length from 1,099 to 2,050 frames. YOLOv3, a state-of-the-art object detection algorithm, is used to determine the impact Scene Caching has on WmAP in comparison to the H.264 compression baseline. The WmAP values are averaged across a given video.

A dataset was developed for evaluating Scene Cache parameter generalization. This dataset contains surveillance footage released onto YouTube by Digital Vision Security (DVS). The footage in the dataset all come from a stationary camera pointed at a traffic intersection. It contains cars, buildings, and pedestrians. Three clips were selected, each capturing the same intersection at daytime, nighttime, and during rain. There are over 100,000 frames of 480p video in total.

For evaluating the dynamic scene cache, a subset of six clips from the DAVIS dataset that contain camera motion was used.

H.264 Accuracy Modeling—The video quality of the Raspberry Pi's on-board Broadcom VideoCore IV H.264 encoder was estimated by performing H.264 encoding on the datasets using FFmpeg. This software-to-software encoding is used to preserve the locations of the objects for object detection, but it precludes testing using the camera-to-software pipeline of the VideoCore IV encoder.

To correlate the settings of the encoders, a source video from one of our datasets was played on a screen and recorded into an H.264 encoded video using a Raspberry Pi Camera.

The same source video was encoded using FFmpeg. In both the VideoCore IV and FFmpeg, the Constant Rate Factor was set to a typical value of 23. The other FFmpeg parameters were selected that produce the video with the most similar bitrate to the video produced by the VideoCore IV.

Experimental Results—The Scene Cache was evaluated on the CDW and DVS datasets. The CDW dataset is used for tuning the cache parameters. The DVS dataset is used to test their generality.

The Scene Cache functions on two hyperparameters: downsampling rate and motion estimation difference threshold. Increasing the downsampling rate reduces processing time for the camera to determine Scene Cache update regions, at the cost of reducing sensitivity to spatial information. Increasing the difference threshold reduces data transferred to the application server, but reduces temporal sensitivity to object motion. Therefore, a parameter sweep may be performed to determine the Scene Cache configuration for an ideal tradeoff between application performance and time/energy efficiency.

Cache Tuning—To tune the cache, the detection accuracy and data transfer of different versions of the cache on the CDW dataset. Data transfer is positively correlated with Scene Cache energy consumption and has smaller fixed overhead, making it easier to compare directly to detection accuracy. Four downsample rates and eighteen difference threshold values were swept for a total of 72 different Scene Caches.

To determine which caches provide the best accuracy-energy tradeoffs, a criterial equation may be used to reduce the multiobjective data transfer versus detection performance criteria to one dimension:

$$S = \alpha*(1.0 - D_x) + (1.0 - \alpha)*A_{cc}. \qquad (8)$$

S is the cache score, with higher values corresponding to better caches. $D_x$ is the ratio of data volume transferred by the Scene Cache to that transferred by a conventional image pipeline. $A_{cc}$ is the WmAP score of the cache. $\alpha \in [0.1]$ is a hyperparameter that trades off the relative importance of data transfer and classification accuracy. A higher value favors caches that reduce the amount of data transferred while a lower value favors caches that are more accurate.

The parameter—may be swept, optimizing S values. Table 4 below shows example cache selection for α from 0.1 and 0.9, their values for WmAP, percent data transfer, and energy consumption. The caches are labeled (d, t), where d is downsample rate and t is difference threshold. Results for two H.264 encoders and the conventional pipeline with full-resolution video are also shown.

TABLE 4

Generalized Cache Selection On CDW Dataset

|  | Cache | WmAP | % Data Transfer | Energy (J) |
|---|---|---|---|---|
| 0.1 | (8, 7) | 0.96 | 39.5% | 0.195 |
| 0.3 | (8, 12) | 0.95 | 27.9% | 0.192 |
| 0.5 | (8, 18) | 0.90 | 19.5% | 0.189 |
| 0.7 | (8, 25) | 0.80 | 11.4% | 0.188 |
| 0.9 | (16, 80) | 0.40 | 1.34% | 0.186 |
| H.264 (Hardware) |  | 0.61 | 1.15% | 0.199 |
| H.264 (Software) |  | 0.61 | 1.15% | 0.199 |
| No Compression |  | 1.00 | 100 | 0.279 |

By coincidence, the hardware- and software-based H.264 encoders had nearly identical energy consumption for the dataset. Both energy equations are essentially linear functions of data volume transferred. The hardware encoder has a higher energy overhead and a lower incremental energy cost per pixel of data transfer compared to the software encoder. The results for different videos in this dataset happen to lie on both sides of their intersection point, making the final average for each encoder similar to the other.

Figure 4:
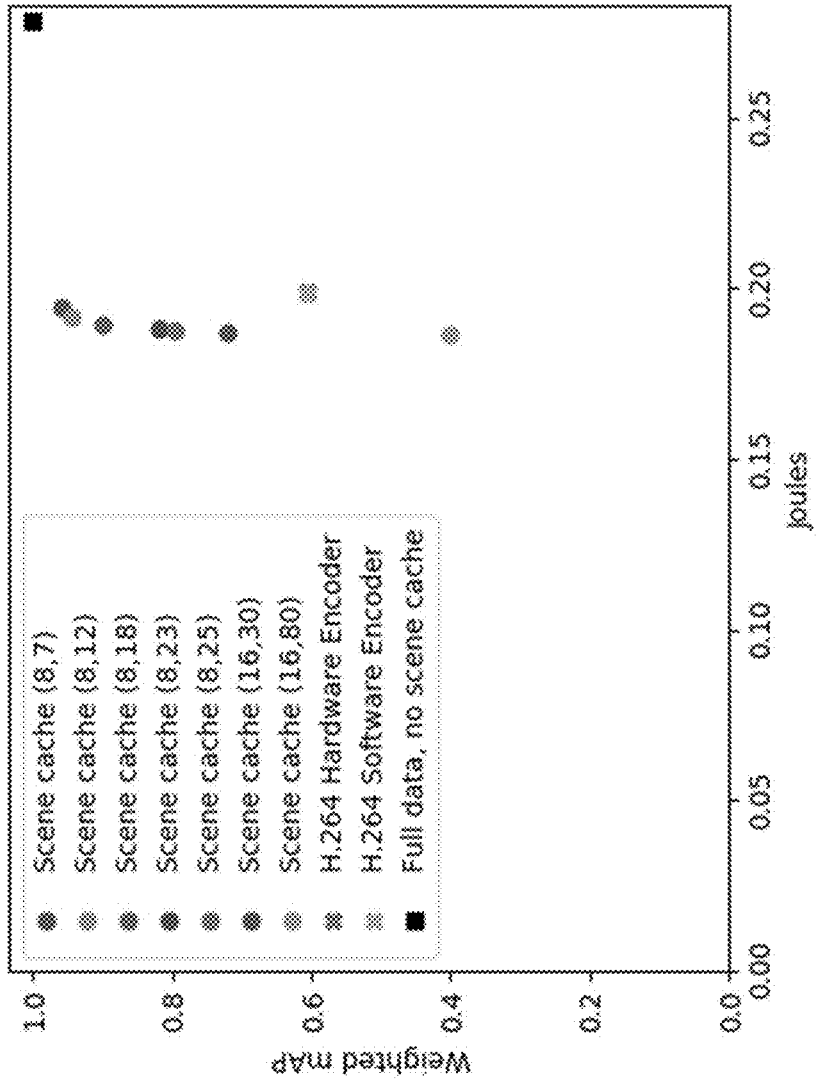
FIG. 4 is a graphical plot of a cache weighted average accuracy for a number of different scene-cache and non-scene cache examples across detected classes in relation to energy consumption in connection with a change detection workshop (CDW) dataset.

This table demonstrates that for nearly all included caches, the Scene Cache achieves better WmAP than H.264. However, as the compression ratio of the H.264 encoder is approached, the Scene Cache does not have a high WmAP. Regardless, the Scene Cache has much better WmAP than H.264 for the same energy consumption in almost all cases: 0.61 for the H.264 encoders; 0.95 (55.7% improvement) for Scene Cache (8, 12) (see FIG. 4). Further, note that the Scene Cache dramatically reduces energy consumption in comparison to the uncompressed baseline. The trend was similar for the DVS data set (see Table 5 below).

TABLE 5

Scene Cache Performance on DVS Dataset

| Cache | WmAP | Energy (J) |
|---|---|---|
| (8, 12) | 0.86 | 0.267 |
| (8, 18) | 0.78 | 0.229 |
| H.264 (Hardware) | 0.65 | 0.211 |
| H.264 (Software) | 0.65 | 0.234 |
| No Compression | 1.00 | 0.525 |

In terms of energy, the Scene Cache sends more data, and it still consumes less energy than H.264 while maintaining higher WmAP.

Testing on the DVS dataset was performed with caches tuned for CDW to see how well they would work on a dataset they had not been trained on. Scene Caches (8,12) and (8,18) were used since both are optimal for multiple values of a. The energy versus accuracy results are shown in Table 5 with H.264 encoders and the uncompressed baseline results for comparison.

In this graph the two caches again achieve better WmAP than H.264, but they only achieve better energy consumption in some cases. Scene Cache (8,18) has a mAP of 0.78

(20% improvement over H.264) and uses 0.229 J/frame of energy, which is 2.0% lower than the H.264 software encoder but 8.8% higher than the H.264 hardware encoder.

Properties of the datasets influence the results. The DVS dataset has higher resolution images than CDW, on average. Therefore, software encoding uses more energy than hardware encoding. The software encoder has a lower fixed overhead but higher incremental energy cost per pixel while the converse is true for the hardware encoder (see Table 2); the hardware encoder is therefore more efficient for large images.

The large image difference does not fully explain why the hardware encoder has lower energy consumption than the Scene Caches. The CDW dataset has one test video (PETS2006) with a frame size slightly larger than DVS. When energy is analyzed for just that video, the energy consumption for the software and hardware encoders and the uncompressed baseline are very similar to DVS, but all of the Scene Caches listed in Table 4 use less energy than either of the H.264 encoders. This implies that the frame size does not explain the discrepancies between the DVS and CDW results.

A more plausible explanation is that Scene Cache performance depends on image content. The caches that performed well on CDW may not be as optimal for DVS. Re-tuning the caches on DVS may improve energy consumption results.

While the Scene Cache may not generalize well between the CDW and DVS datasets, preliminary Scene Cache results trained on 80% of the CDW data and tested on 20% of the CDW data showed similar energy and accuracy results to Table 4. Thus Scene Cache can be trained to work well with new data in the same application. This is a reasonable constraint for the problem domain of stationary cameras since the application is generally fixed.

A comparison of the amount of energy used by each part of the pipeline for experiments on the CDW and DVS datasets demonstrated the utility of one example of the disclosed methods and systems. The results of hardware H.264 encoding and a pipeline using no compression were also compared with the example. Transmission, compression, ISP, and system idle energy consumption dominated. The qualitative difference between the scene caching of the disclosed methods and systems and H.264 encoder is a tradeoff between transmission and compression energy. Since transmission energy is correlated with data volume, this implies a tradeoff between the benefit of data compression and its energy cost. Both hardware and software H.264 encoders achieve high enough compression ratios that their transmission energies are negligible. The scene caching of the disclosed methods and systems imposes very little overhead and is more accurate, but does not reduce transmissions as much as H.264. It is important to note that the scene caching of the disclosed methods and systems produces higher WmAP scores than H.264 at similar energy cost.

The system idle energy is constant for both the scene caching of the disclosed methods and systems and the other compression algorithms, often dominating the energy cost per frame. This reduces the flexibility of system designers in making compression tradeoffs to save energy.

The scene caching of the disclosed methods and systems reduces the amount of data processed by the sensor and ISP. This results in reduced sensor energy, which has little impact at the system level since the sensor already consumes little energy in the base case. The energy increase of the ISP is due to the multi-round nature of the Scene Cache incurring the data-independent energy overhead twice. This may be improved through more extensive redesign of the ISP for multi-round image sensing. Communication energy is not visible in the plot as it consumes less than 0.1% of the system energy.

Dynamic Scene Cache—The dynamic Scene Cache is evaluated on the subset of DAVIS videos with camera motion. The same tuning and cache selection procedure may be applied. Table 6 below shows the % data transfer and energy results for the three best caches selected out of 24 different cache versions. The best caches achieve better or equivalent WmAP scores than H.264. Some of the best caches have lower data transfer than uncompressed video, but the data compression rate is not as large as with the static scene cache. As with the static Scene Cache, H.264 provides better compression by an order of magnitude.

TABLE 6

Dynamic Scene Cache Performance on DAVIS Dataset

| Cache | WmAP | % Data Transfer | Energy (J) |
|---|---|---|---|
| (8, 10) | 0.97 | 102.1% | 2.22 |
| (8, 30) | 0.94 | 82.4% | 0.90 |
| (8, 50) | 0.76 | 65.7% | 0.87 |
| H.264 (Hardware) | 0.76 | 3.33% | 0.21 |
| H.264 (Software) | 0.76 | 3.33% | 0.23 |
| No Compression | 1.00 | 100% | 0.53 |

The energy consumption of the dynamic Scene Cache is high in all cases both compared to H.264 and uncompressed video. This is likely a result of both the increased complexity of the motion compensation operations as well as the increase in % data transfer as compared to the static Scene Cache.

There are multiple ways that compression rates of the dynamic Scene Cache can be improved. One improvement may involve the feature extractors. It was discovered during testing that sometimes the SIFT features focus on moving objects in the frame, e.g., corners on a moving bus, rather than on the non-moving backgrounds that are tracked to correct for camera motion. Using macroblock-based key point matching with a robust estimator may yield superior results: the camera motion correction may focus on the largest set of macroblocks with similar motion, which can be reasonably assumed to be the background in most cases. Using macroblock features would be similar to using optical flow.

Another option for improvement may be a different camera motion model. Homographies do not account for parallax, which is present in any translative camera motion. A region-based or parallax-aware motion model may achieve a more accurate camera motion correction.

The energy consumption of the motion correction framework may be evaluated further to identify how to reduce the energy consumption of the dynamic Scene Cache.

Scene Cache may provide an application specific compression framework for embedded machine vision systems. In the case of the static Scene Cache, it achieves significantly better object detection results than hardware-aided H.264 at similar or improved levels of energy consumption. A new energy model and video dataset aid in evaluation. When tuned on a dataset, in one example, Scene Caching improves object detection WmAP by 0.34 (55.7% improvement) while enabling slightly (3.6%) lower energy consumption than H.264. When generalized to datasets it was not tuned on, in one example, Scene Cache still improves object detection by 0.13 (20% improvement) while using similar energy to H.264 (8.8% higher than hardware and 2.0% lower than software).

The dynamic Scene Cache is not as energy-efficient as the static Scene Cache nor even uncompressed video. While the dynamic Scene Cache does have similar performance enhancements in terms of WmAP scores (similar to static Scene Cache), the motion correction is energy-expensive and does not compress data as much as in the static case, further contributing to increased energy consumption.

Figure 5:
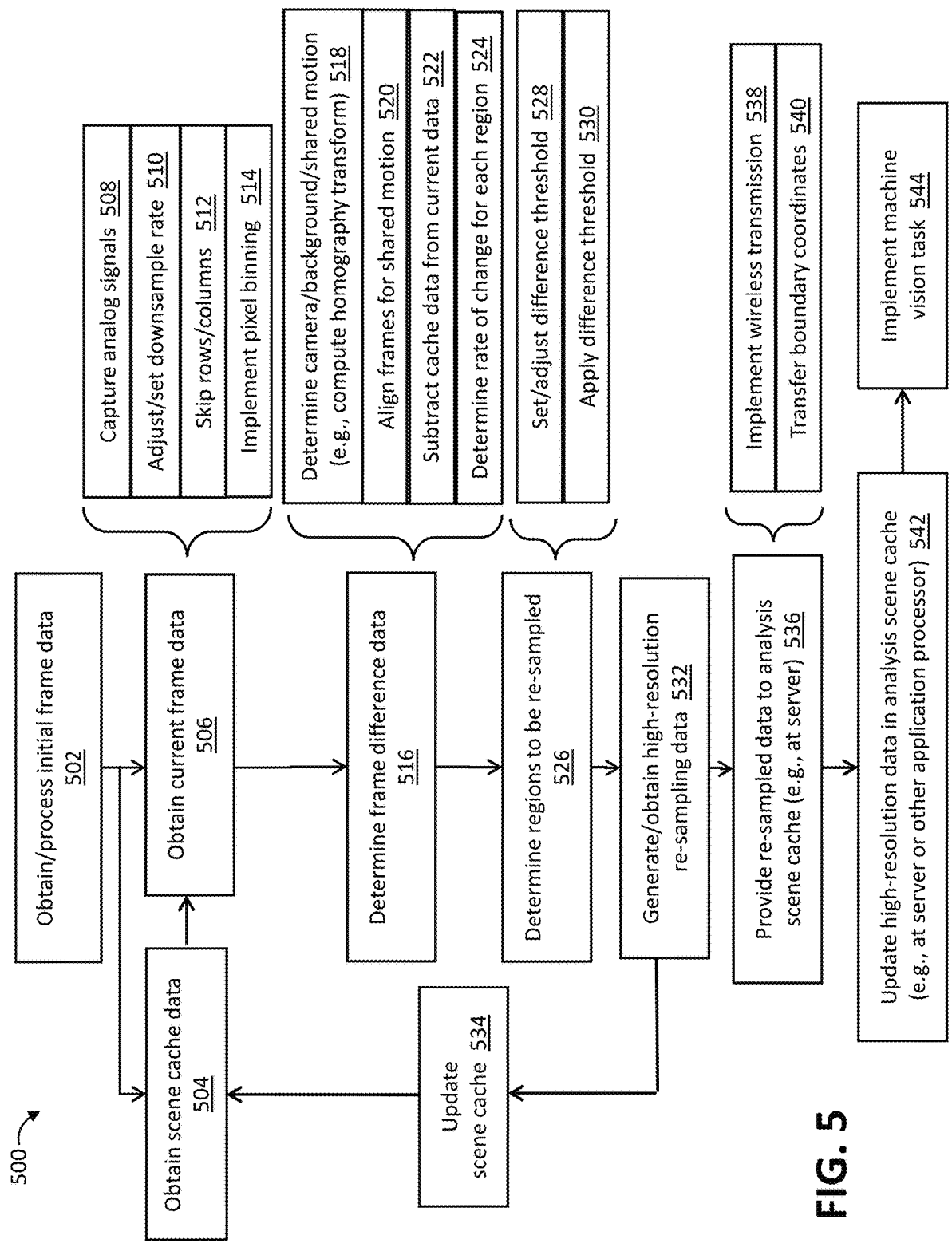
FIG. 5 is a flow diagram of a method of processing a video stream with scene cache functionality in accordance with one example.

FIG. 5 depicts a method 500 for processing a video stream in accordance with one example. The method 500 may be implemented by one or more of the processors described herein. For instance, the method 500 may be implemented by an encoder and/or other processor at a camera node or other image signal processing node or location. Additional and/or alternative processors may be used. For instance, one or more acts of the method 500 may be implemented by an application processor, such as a processor configured to execute a machine vision task.

The method 500 includes an act 502 in which one or more procedures are implemented to obtain and/or otherwise process an initial frame of the video stream. As described herein, the initial frame may be processed at a resolution higher than the sampling of the method 500. Such initial processing may include a one-time transfer of the frame data to establish the scene cache for the processing of subsequent frames. The extent to which the initial frame data is downsampled and/or otherwise processed for the scene cache may vary.

The subsequent frames in the video stream may then be processed in a pipeline as described below.

With each subsequent frame, the data in the scene cache may be obtained in an act 504. In other cases, the scene cache data may already be stored in resident or other accessible memory. The scene cache data may be stored in any manner as a scene cache for the video stream.

Frame data of a current frame of the video stream is obtained in an act 506. Obtaining the current frame data may include capturing analog signals from a camera in an act 508. The captured signals may then be sampled in accordance with a downsample rate adjusted or otherwise set in an act 510. The manner in which the signals are downsampled may vary. In some cases, rows and/or columns are skipped in an act 512. Alternatively or additionally, pixel binning is implemented in an act 514.

In an act 516, frame difference data is determined based on a comparison of the frame data of the current frame and scene cache data for a previous frame of the video stream. In some cases, the act 516 includes an act 518 in which shared motion data for the frame data is determined, and an act 520 in which the frame data and the scene cache data are aligned based on the shared motion data. The acts 518 and 520 may be performed before implementing the comparison. In some cases, determining the shared motion data includes computing a homography transform matrix for the frame data. Further details regarding the use of a homography transform matrix for motion compensation are set forth below in connection with the example of FIG. 6.

In some cases, determining the frame difference data includes subtracting the scene cache data from the frame data of the current frame in an act 522. Additional or alternative techniques may be used. For instance, other comparisons may be implemented to determine a rate of change for each region of the video stream in an act 524.

In an act 526, regions to be re-sampled are determined based on the frame difference data. The regions of the video stream are re-sampled at a higher resolution than the frame data. In some cases, the determination includes adjusting or otherwise setting a difference threshold in an act 528, and applying a difference threshold to the frame difference data in an act 530. The difference threshold may be varied as an operational parameter described herein.

Re-sampling data is generated and/or obtained for the determined regions in an act 532. For example, the re-sampling data may be generated by an image signal processor, and obtained by an encoder or other processor coupled to the image signal processor.

In an act 534, the scene cache data is updated based on the obtained frame data and the re-sampling data. The re-sampling data is also provided in an act 536 to another processor (e.g., a decoder or other processor in the pipeline) to update an analysis scene cache for the video stream. In some cases, the act 536 includes implementation of a wireless transmission in an act 538, but the nature of the data transfer may vary. The act 536 may also include transferring, to the second processor, boundary coordinates for the re-sampling data in an act 540. Control may return to the act 504 as shown in FIG. 5 in preparation for the processing of the next frame in the video stream.

In some cases, the method 500 includes the analysis or other processing of the video stream. In the example of FIG. 5, a machine vision task is implemented in an act 544 based on the updated analysis scene cache. The act 544 may be implemented by an application processor or other processor.

The method 500 may include additional, fewer, or alternative acts. For instance, the method 500 may not include implementation of a machine vision task in the act 544. The acts of the method 500 may be implemented in an order differing from the example shown. For instance, the order of the acts 504 and 506 may vary.

In one example of a scene cache-based system, camera motion might be interpreted as motion of all objects in a scene, resulting in wasteful transmission and processing of predictable data. There might also be redundant transmission of data for numerous blocks within a large object that all share the same motion pattern, and therefore are predictable.

In the case of moving or rotating cameras, block change may be the result of simply and compactly specified motion or rotation that can be procedurally applied to the entire scene, thereby reducing transmitted data. This approach can also be applied in the case of large objects that move or rotate, where changes to blocks within the object can be efficiently encoded given information about the common motion within the block.

The disclosed methods and systems may implement a procedure to efficiently encode data in the presence of camera and object motion to avoid wasteful transfer and analysis of predictable data. In some aspects and cases, the procedure uses optical flow, motion estimation, and motion segmentation to identify and sample regions of a scene sharing similar motion patterns, e.g., the entire scene in the case of camera motion or rotation as well as (semi-)rigid objects.

The global motion estimation and motion segmentation may be configured to estimate motion caused by camera movement in a video sequence, and may be done in either pixel domain or vector domain. Vector-domain approaches are computationally less demanding, because they utilize block-based motion vectors that are relatively easy to calculate. Block-based optical flows may be computed as motion vectors to describe movements between two consecutive frames and an optical flow clustering algorithm may be used to separate local motion away from background motion.

The background motion may be estimated using the corresponding optical flows. The estimated motion may then be used to align two consecutive frames for motion compensation.

Figure 6:
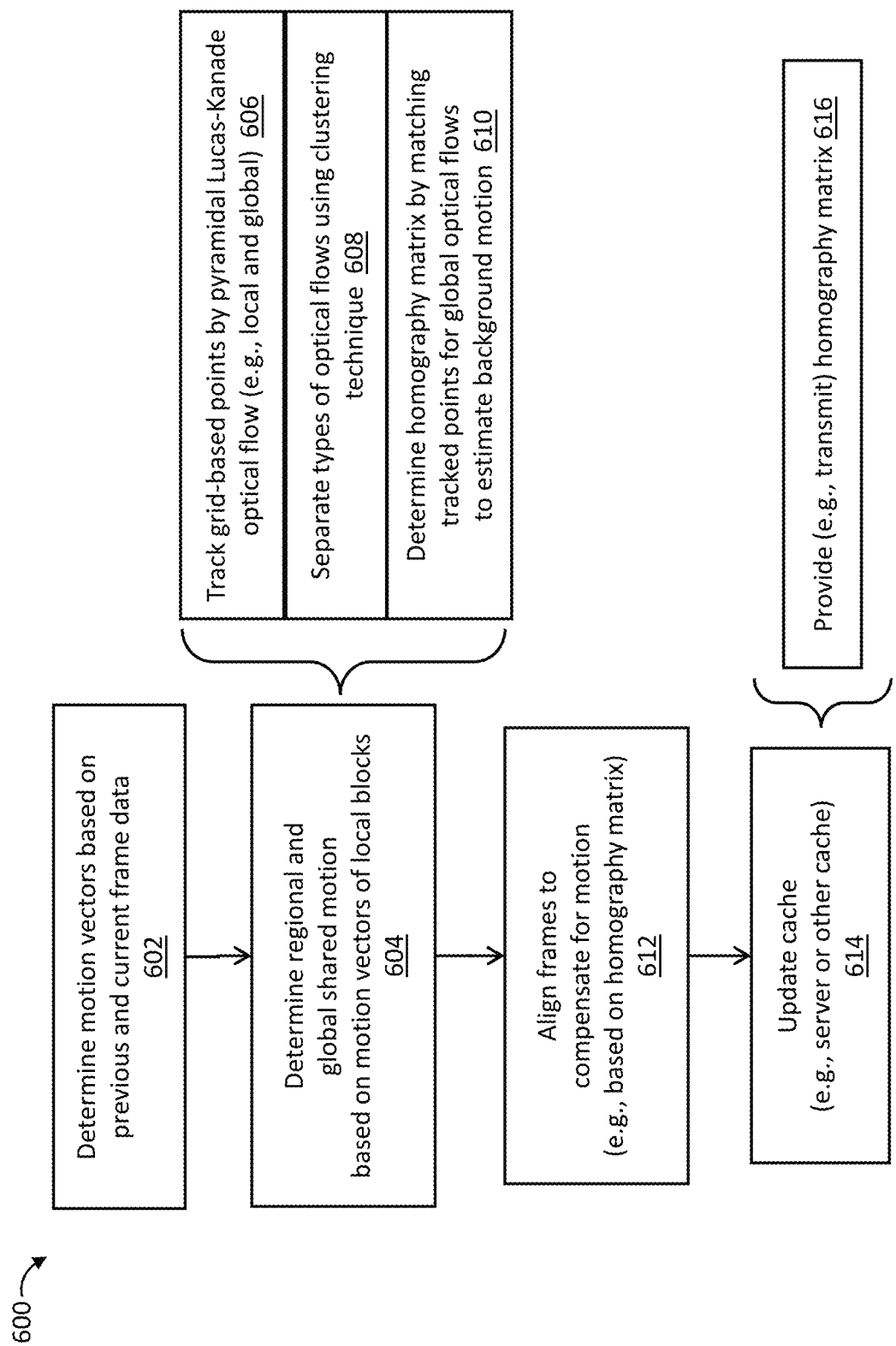
FIG. 6 is a flow diagram of a motion compensation technique of a scene cache-based method in accordance with one example.

FIG. 6 depicts a method 600 for motion compensation in accordance with one example. The method 600 may be incorporated into the method 500 of FIG. 5 or another method. The method 600 may be useful in connection with various types or sources of motion, including, for instance, global motion arising camera movement and non-global motion arising from block movement. Both background and other shared motion may thus be addressed.

In the example of FIG. 6, the method 600 includes an act 602 in which motion vectors are determined based on the frame data and the scene cache data. Regional shared motion data and global shared motion data may then be determined in an act 604 based on the motion vectors. In some cases, the act 604 includes tracking grid-based points by local and global optical flows (e.g., by pyramidal Lucas-Kanade optical flow) in an act 606, separating the local and global optical flows using a clustering technique in an act 608, and determining the homography matrix by matching tracked points for the global optical flows to estimate background motion in an act 610. Further details regarding examples of these acts are provided below.

The manner in which optical flow, motion estimation, and motion segmentation may be incorporated into the scene cache functionality of the disclosed methods and systems is now described. The resulting motion compensation may provide improved performance on moving or rotating cameras and scenes with large moving objects.

Before computing the frame difference, the motion vectors between the previous frame and the current frame are calculated. Next, regional and global shared motion are determined based on the motion vectors of local blocks. Motion caused by the camera movement and/or shared motion of blocks associated with large objects is then compensated before computing the frame difference.

In one example, the shared background motion may be computed using a homography transform. The grid-based key points are tracked by the pyramidal Lucas-Kanade optical flow. Optical flows may be divided in two types: local optical flows describe the movement of local objects, and global optical flows describe the global motion. Global optical flows may be viewed as a special case of local flows, e.g., the background may represent the largest object in the scene.

An optical flow clustering procedure may be used to separate the types of optical flows. For instance, the procedure described in Chen et al., "A Joint Approach to Global Motion Estimation and Motion Segmentation from a Coarsely Sampled Motion Vector Field," IEEE Transactions on Circuits and Systems for Video Technology, vol. 21, no. 9, pp. 1316-1328 (2011), may be used. After using an optical flow clustering procedure, the homography matrix may be calculated by matching the key points tracked by global optical flows to estimate the background motion and align two frames.

In an act 612, the frames are then aligned to compensate for the motion. The alignment may be based on the homography matrix. The differences of the aligned frames may then be taken.

The scene cache may then be updated in an act 614. To update the scene cache at the analysis (e.g., server node), the homography matrix may be transmitted or otherwise provided in an act 616. For instance, a homography matrix that estimates background motion may be transmitted to a remote server for use in updating the cache. As a result, one processor (e.g., an encoder) may be used to update the cache on the camera portion of the pipeline, while another processor (e.g., a decoder) may be used to update the cache on the analysis side.

Overall, the scene cache functionality of the disclosed methods and systems enables the tradeoff of system energy consumption for application performance in machine vision systems. The Scene Cache may be used for videos containing dynamic backgrounds. Efficiency may be increased by, for instance, making sampling decisions based on statistical importance of image regions to the machine vision task. Goal-based sensing for highly efficient machine vision may thus be provided.

The scene cache functionality may provide or work as a general-purpose video compressor, making data transmission decisions based on reconstruction error. The scene cache may base sampling not only off of temporal change between frames but also spatial relevance of the sampling region. The outcome of CNN decisions are more affected by some pixels rather than others. The scene cache may take this into account to decide different sampling rates for change in different parts of an image. An example could be a traffic monitoring application that learns the accuracy of its decisions are less affected by regions corresponding to sky than to regions corresponding to road. It would adjust its sampling accordingly to be more responsive to sampling change on the road than in the sky.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A method for processing a video stream, the method comprising:
   obtaining, by a first processor from an image sensor, frame data of a current frame of the video stream;
   determining, by the first processor, frame difference data based on a comparison of the frame data of the current frame and scene cache data for a previous frame of the video stream, the scene cache data being stored in a scene cache for the video stream;
   determining, by the first processor, based on the frame difference data, regions of the video stream to be re-sampled at a higher resolution than the frame data;
   obtaining, by the first processor from the image sensor, re-sampling data for the determined regions;
   updating, by the first processor, the scene cache data based on the obtained frame data and the re-sampling data; and
   providing, by the first processor, the re-sampling data to a second processor to update an analysis scene cache for the video stream.

2. The method of claim 1, wherein determining the frame difference data comprises subtracting the scene cache data from the frame data of the current frame.

3. The method of claim 1, wherein determining the frame difference data comprises:
   determining, by the first processor, shared motion data for the frame data; and
   aligning, by the first processor, the frame data and the scene cache data based on the shared motion data before implementing the comparison.

4. The method of claim 3, wherein determining the shared motion data comprises computing, by the first processor, a homography transform matrix for the frame data.

5. The method of claim 4, wherein providing the re-sampling data comprises providing the homography transform matrix to the second processor.

6. The method of claim 3, wherein determining the shared motion data comprises determining, by the first processor, motion vectors based on the frame data and the scene cache data.

7. The method of claim 1, wherein determining the regions to be re-sampled comprises applying a difference threshold to the frame difference data.

8. The method of claim 1, wherein determining the frame difference data comprises determining a rate of change for each region of the video stream.

9. The method of claim 1, wherein providing the re-sampling data comprises transferring, to the second processor, boundary coordinates for the re-sampling data.

10. A method for processing a video stream, the method comprising:
    obtaining, by a first processor, frame data of a current frame of the video stream;
    determining, by the first processor, frame difference data based on a comparison of the frame data of the current frame and scene cache data for a previous frame of the video stream, the scene cache data being stored in a scene cache for the video stream;
    determining, by the first processor, based on the frame difference data, regions of the video stream to be re-sampled at a higher resolution than the frame data;
    obtaining, by the first processor, re-sampling data for the determined regions;
    updating, by the first processor, the scene cache data based on the obtained frame data and the re-sampling data; and
    providing, by the first processor, the re-sampling data to a second processor to update an analysis scene cache for the video stream;
    wherein determining the frame difference data comprises:
       determining, by the first processor, shared motion data for the frame data; and
       aligning, by the first processor, the frame data and the scene cache data based on the shared motion data before implementing the comparison;
    wherein determining the shared motion data comprises determining, by the first processor, motion vectors based on the frame data and the scene cache data; and
    wherein determining the shared motion data comprises determining, based on the motion vectors, regional shared motion data and global shared motion data.

11. The method of claim 10, wherein determining the regional shared motion data and the global shared motion data comprises:
    tracking grid-based points by local and global optical flows; and
    separating the local and global optical flows using a clustering technique.

12. A machine vision method comprising:
    obtaining, by a first processor from an image sensor, frame data of a current frame of the video stream;
    determining, by the first processor, frame difference data based on a comparison of the frame data of the current frame and scene cache data for a previous frame of the video stream, the scene cache data being stored in a scene cache for the video stream;
    determining, by the first processor, based on the frame difference data, regions of the video stream to be re-sampled at a higher resolution than the frame data;
    obtaining, by the first processor from the image sensor, re-sampling data for the determined regions;
    updating, by the first processor, the scene cache data based on the obtained frame data and the re-sampling data;
    transmitting, by first processor, the re-sampling data to a second processor to update an analysis scene cache for the video stream;
    updating, by the second processor, the analysis scene cache in accordance with the transmitted re-sampling data; and
    implementing, by an application processor, a machine vision task based on the updated analysis scene cache.

13. A system for processing a video stream, the system comprising:
    an image sensor configured to capture frame data of a current frame of a video stream; and
    a first processor coupled to the image sensor, the first processor being configured to—
       obtain the frame data from the image sensor;
       determine frame difference data based on a comparison of the frame data of the current frame and scene cache data for a previous frame of the video stream, the scene cache data being stored in a scene cache for the video stream;
       determine, based on the frame difference data, regions of the video stream to be re-sampled at a higher resolution than the frame data;
       obtain, from the image sensor, re-sampling data for the determined regions;
       update the scene cache data based on the obtained frame data and the re-sampling data; and
       provide the re-sampling data to a second processor to update an analysis scene cache for the video stream.

14. The system of claim 13, further comprising an application processor coupled to the second processor and configured to implement a machine vision task based on the analysis scene cache.

15. The system of claim 13, wherein the first processor is integrated with an image signal processor at a camera node.

16. The system of claim 13, further comprising a computer server remote from the image sensor, the computer server comprising the second processor.

17. The system of claim 13, wherein the first and second processors are configured as an encoder and a decoder, respectively.

18. The system of claim 13, wherein the first processor is further configured to determine the frame difference data by subtracting the scene cache data from the frame data of the current frame.

19. The system of claim 13, wherein the first processor is further configured to determine shared motion data for the frame data, and align the frame data and the scene cache data based on the shared motion data before implementing the comparison.

20. The system of claim 13, wherein the first processor is further configured to transfer, to the second processor, boundary coordinates for the re-sampling data.

* * * * *